United States Patent [19]
Wolf

[11] 3,844,801
[45] Oct. 29, 1974

[54] CLADDING GLASS COMPOSITIONS FOR LIGHT TRANSMITTING GLASS FIBERS

[75] Inventor: Warren W. Wolf, Columbus, Ohio

[73] Assignee: Owens-Corning Fiberglas Corporation, Toledo, Ohio

[22] Filed: Oct. 16, 1972

[21] Appl. No.: 299,510

Related U.S. Application Data

[62] Division of Ser. No. 113,688, Feb. 8, 1971, abandoned.

[52] U.S. Cl............. 106/50, 106/54, 350/96 B
[51] Int. Cl.................. C03c 13/00, G02b 5/16
[58] Field of Search......... 106/50, 52, 54; 350/96 B

[56] References Cited
UNITED STATES PATENTS

| | | | |
|---|---|---|---|
| 2,877,124 | 3/1959 | Welsch | 106/54 |
| 2,992,516 | 7/1961 | Norton | 350/96 B |
| 3,008,841 | 11/1961 | Tiede | 106/54 |
| 3,498,805 | 3/1970 | Stalego | 106/50 |
| 3,607,322 | 9/1971 | Brady | 106/54 |

FOREIGN PATENTS OR APPLICATIONS

| | | | |
|---|---|---|---|
| 214,055 | 5/1968 | U.S.S.R. | 106/52 |

*Primary Examiner*—Helen M. McCarthy
*Attorney, Agent, or Firm*—Carl G. Staelin; John W. Overman; Patrick P. Pacella

[57] ABSTRACT

Cladding glass compositions are disclosed for use in producing light transmitting glass fibers. These fibers are composed of a central core glass surrounded by an outer cladding glass. The cladding glasses have the following range of proportions (by weight): $SiO_2$, 58–68 percent; $Al_2O_3$, 8–10 percent; CaO, up to 4 percent; MgO, up to 2 percent; $B_2O_3$, 10–12 percent; $Na_2O$, 13–15 percent; and $Li_2O$, 2–3 percent.

1 Claim, No Drawings

CLADDING GLASS COMPOSITIONS FOR LIGHT TRANSMITTING GLASS FIBERS

This is a division, of application Ser. No. 113,668, filed Feb. 8, 1971 now abandoned.

BACKGROUND OF THE INVENTION

This invention relates to the field of fiber optics where light is transmitted from one point to another by small diameter fibers. These light transmitting fibers are composed of a central core surrounded by an outer cladding or sheath. This invention specifically relates to cladding glass compositions for light transmitting fibers made of glass.

In the fiber optics field individual light transmitting fibers or filaments are bundled together to form "light pipes." The fibers used to produce light pipes are flexible. Therefore the light pipes can be curved around obstacles or placed in remote areas where common light sources such as light bulbs are unsafe or hard to install.

Light pipes are useful as monitoring and lighting devices in automobiles, aircraft, appliances, computers and medical instruments. They are particularly useful where noncurrent carrying and therefore nonshorting or nonsparking light transmitting devices are required for safety.

Light pipes are used in some late model automobiles. They are run from the automobile headlights and tailights to the dashboard. As long as the headlight or taillight is operating, the light pipe transmits light and shows the driver that the lights are on. If one of the lights fails, no light is transmitted by the light pipe connected to that light and the driver knows that the bulb has burned out.

Light pipes are also useful for lighting dashboard or control panel instruments. By running many light pipes from a single, easily accessible light bulb to each of the panel instruments, the need for many small, remotely located light bulbs is eliminated. Only one bulb is needed to light all instruments. And only one light bulb needs replacing.

Light transmitting or optical fibers are usually made of either plastic or glass. Glass fibers are preferred over plastic fibers because of their high heat resistance. The ability of glass to withstand adverse temperature and humidity conditions for long periods of time is also a factor in selecting glass fibers over plastic fibers. While plastic fibers become brittle and discolor at temperatures above about 175°F. or show a reduction in light transmission when exposed to long periods of high heat and humidity, glass light pipes are unaffected by high humidity and temperatures in excess of 550°F.

Individual optical fibers or filaments used in light pipes are composed of two essential parts, namely a central core and an outer cladding or sheath. The cladding surrounds the core. The index of refraction of the core is higher than the index of refraction of the cladding. Due to this difference between the index of refraction of the core and cladding, the light entering one end of a fiber is internally reflected along the length of the fiber. The principle of "total internal reflection" explains this result. This principle says that a light ray traveling from a material with a higher refractive index (core) to a material with a lower refractive index (cladding) will be reflected at the interface of the two materials.

The amount of light transmitted through a light pipe depends on the intensity of the light source, the cross sectional area of the cores of all the fibers, the losses at each end due to reflection, the absorption properties of the glass and the length of the light pipe.

In making commercially acceptable glass light pipes the chemical composition of the core and cladding is a key factor. In addition to having the proper indices of refraction the core and cladding glasses should have similar viscosities, coefficients of expansion and liquidus temperatures. These three properties control the ease with which the cladding glass can be laid over the core glass. And when conventional glass fiber forming processes are used to make optical fibers, compatability of the core and cladding is crucial.

Conventional glass fiber forming processes draw fine glass fibers from small holes in the bottom of a reservoir of molten glass. The usual problems of forming fibers the conventional way are multiplied when making optical glass fibers. Two supplies of molten glass are needed; one of the core glass and one of the cladding glass. Then a composite fiber, 85–90 percent core and 10–15 percent cladding, is pulled from the glass supplies. To be able to do this at commercial speeds and form commercially acceptable products the composition of the core and cladding glasses must be carefully chosen.

SUMMARY OF THE INVENTION

This invention discloses cladding glass compositions useful in the production of optical glass fibers. These cladding glass compositions can be combined with compatible core glass compositions to form optical fibers. These fibers will transmit light and have the physical properties required in most commercial applications. And these cladding glasses can be combined with core glass compositions using conventional fiber forming techniques.

The cladding or sheath glasses of this invention fall within the following range of proportions:

| Ingredient | Percent by Weight |
| --- | --- |
| $SiO_2$ | 58 – 65 |
| $Al_2O_3$ | 8 – 10 |
| CaO | up to 4 |
| MgO | up to 2 |
| $B_2O_3$ | 10 – 12 |
| $Na_2O$ | 13 – 15 |
| $Li_2O$ | 2 – 3 |

Cladding glasses in this range of ingredients have an index of refraction of about 1.50 to 1.52. These cladding glasses can be used to make light transmitting fibers by combining them with core glasses having an index of refraction of about 1.56 to 1.65.

DESCRIPTION OF THE INVENTION

This invention discloses cladding glass compositions useful in the production of glass fibers which transmit light. These compositions are useful in making optical fibers with conventional glass fiber forming techniques.

Preferred cladding glass compositions of this invention fall within the following range:

| Ingredient | Percent by Weight |
|---|---|
| $SiO_2$ | 64 – 65 |
| $Al_2O_3$ | 8 – 9 |
| $B_2O_3$ | 11 – 12 |
| $Na_2O$ | 13 – 15 |
| $Li_2O$ | 2 – 3 |

Core glass compositions compatible with the cladding glass compositions of this invention may have the following range of proportions:

| Ingredient | Percent by Weight |
|---|---|
| $SiO_2$ | 23 – 41 |
| $Al_2O_3$ | 7 – 10 |
| $B_2O_3$ | 2.5 – 11 |
| $K_2O$ | up to 10 |
| $BaO$ | 34 – 59 |
| $Sb_2O_3$ | up to 0.05 | hese core glass compositions are disclosed and discussed in copending U.S. Pat. application Ser. No. 827,056, filed May 22, 1969.

Specific cladding glass compositions embodying the principles of this invention are set forth in Examples 1 through 5.

Example 1

| Ingredient | Percent by Weight | Mole Percent |
|---|---|---|
| $SiO_2$ | 64.1 | 66 |
| $Al_2O_3$ | 8.2 | 5 |
| $B_2O_3$ | 11.2 | 10 |
| $Na_2O$ | 14.0 | 14 |
| $Li_2O$ | 2.4 | 5 |

Liquidus: No devitrification at 1,455° to 1,850°F. over a period of 64 hours

| Log Viscosity | Temp., °F. |
|---|---|
| 2.0 | 2470 |
| 2.5 | 2180 |
| 3.0 | 1970 |

Example 2

| Ingredient | Percent by Weight |
|---|---|
| $SiO_2$ | 61.9 |
| $Al_2O_3$ | 9.6 |
| $B_2O_3$ | 10.9 |
| $Na_2O$ | 15.0 |
| $Li_2O$ | 2.3 |

Liquidus: No devitrification at 1,455° to 1,850°F. over a period of 64 hours

| Log Viscosity | Temp., °F. |
|---|---|
| 2.0 | 2350 |
| 2.5 | 2085 |
| 3.0 | 1885 |

Example 3

| Ingredient | Percent by Weight | Mole Percent |
|---|---|---|
| $SiO_2$ | 62.7 | 64.5 |

Example 3-Continued

| Ingredient | Percent by Weight | Mole Percent |
|---|---|---|
| $Al_2O_3$ | 8.2 | 5 |
| $B_2O_3$ | 11.2 | 10 |
| $Na_2O$ | 14.0 | 14 |
| $Li_2O$ | 2.4 | 5 |
| $CaO$ | 0.9 | 1 |
| $MgO$ | 0.3 | 0.5 |

Liquidus: No devitrification at 1,455° to 1,850°F. over a period of 64 hours

| Log Viscosity | Temp., °F. |
|---|---|
| 2.0 | 2420 |
| 2.5 | 2140 |
| 3.0 | 1940 |

Example 4

| Ingredient | Percent by Weight | Mole Percent |
|---|---|---|
| $SiO_2$ | 61.44 | 63 |
| $Al_2O_3$ | 8.28 | 5 |
| $B_2O_3$ | 11.29 | 10 |
| $Na_2O$ | 14.09 | 14 |
| $Li_2O$ | 2.43 | 5 |
| $CaO$ | 1.82 | 2 |
| $MgO$ | 0.66 | 1 |

Liquidus: No devitrification at 1,310° to 1,810°F. after 16 hours

| Log Viscosity | Temp., °F. |
|---|---|
| 2.0 | 2285 |
| 2.5 | 2035 |
| 3.0 | 1855 |

Example 5

| Ingredient | Percent by Weight | Mole Percent |
|---|---|---|
| $SiO_2$ | 58.7 | 60 |
| $Al_2O_3$ | 8.3 | 5 |
| $B_2O_3$ | 11.3 | 10 |
| $Na_2O$ | 14.1 | 14 |
| $Li_2O$ | 2.4 | 5 |
| $CaO$ | 3.7 | 4 |
| $MgO$ | 1.3 | 2 |

Liquidus: No devitrification at 1,310° to 1,810°F. after 16 hours

| Log Viscosity | Temp., °F. |
|---|---|
| 2.0 | 2215 |
| 2.5 | 1985 |
| 3.0 | 1815 |

The refractive index of each of the cladding glasses in Examples 1 through 5 is between 1.50 and 1.51.

The silica ($SiO_2$) content of the cladding glasses in Examples 1 through 5 should not exceed about 65 percent by weight of the composition. Higher amounts of silica can result in seed formation which can cause fiber breakage as the fibers are being drawn from a molten supply of glass.

$Al_2O_3$, $B_2O_3$ and $Na_2O$ are included in the cladding glasses to control liquidus. $Li_2O$ is added as a fluxing agent.

CaO and MgO may be added (as in Examples 3, 4, 5) to increase the durability of the cladding glass. In Examples 3, 4 and 5 these oxides were added in place of equivalent amounts of silica to alter the viscosity and obtain a more fluid glass.

No devitrification or crystallization was noted in the glasses of Examples 1 through 5 over a large temperature range. This means that these glasses have a safe, wide working range. They will offer, in production, a long dwell time for the cladding. This is important in making optical glass fibers since the cladding glass only accounts for 10 percent of the composite fiber. Since less cladding is used it generally stays in a molten condition longer than the core glass. If the cladding glass can be kept in a vitreous or glassy (i.e. no crystals) state over a wide temperature range it will certainly aid in smooth and uninterrupted production. This is because crystals in either the core or cladding glass can cause fiber breaks and production shutdowns.

Any one of the cladding glasses of Examples 1–5 may be combined with a core glass having a composition within the above mentioned range of acceptable core glass proportions. These combinations of core and cladding glasses would produce light transmitting glass fibers.

A preferred combination of core and cladding glasses in the cladding glass of Example 1 and a core glass having the following composition:

| Ingredient | Percent by Weight |
|---|---|
| $SiO_2$ | 31.9 |
| $Al_2O_3$ | 8.0 |
| $B_2O_3$ | 6.1 |
| $K_2O$ | 6.1 |
| BaO | 47.9 |
| $Sb_2O_3$ | 0.05 |

This core glass is substantially the same as the core glass of Example 3 of U.S. Pat. application Ser. No. 827,056, filed May 22, 1969.

Light transmitting fibers made from this core glass and the Example 1 cladding glass have a numerical aperture of 0.54 and tensile strength of 210,000 psi. More than 60 percent of light entering 5 foot lengths of these fibers will be internally reflected and transmitted out the opposite end. In a 15 foot length 28 percent of the entering light is transmitted. Comparable properties are believed attainable by the combination of any of the other disclosed cladding and core glasses.

It has been found that if the overall fiber diameter of an individual optical fiber is in the range of 1.5–2.5 mils the fiber possesses desired flexibility and handling characteristics which help eliminate fiber breakage problems. Fibers having a diameter substantially in excess of 2.5 mils have decreased flexibility and consequent high incidence of breakage. Conversely, fibers having a diameter substantially less than 1.5 mils are found to be deficient in transmitting the desired amount of light; this follows from the fact that below 1.5 mils the cross-sectional light transmitting area is greatly reduced. Of the preferred 1.5–2.5 mil fiber diameter, about 85–90 percent should be composed of core glass and 10–15 percent cladding glass. Although a cladding glass layer as low as 5 percent of the total fiber diameter has been placed on core glasses, the ability to control such a thin layer and maintain a continuous cladding layer becomes a major problem at commercial fiber production rates. Since any discontinuity of the cladding glass is detrimental to light transmission, it has been found advisable to keep the cladding glass layer at about 10 percent of the overall fiber diameter.

Modifications and variations within the scope of the appended claims are intended to be included.

I claim:

1. A light transmitting optical fiber bundle comprising a plurality of light transmitting glass fibers;
said light transmitting glass fibers comprising a core glass surrounded by a cladding glass;
said core glass consisting essentially by weight of:

| | Percent |
|---|---|
| $SiO_2$ | 23–41 |
| $Al_2O_3$ | 7–10 |
| $B_2O_3$ | 2.5–11 |
| $K_2O$ | up to 10 |
| BaO | 34–59 |
| $Sb_2O_3$ | up to 0.05 | and said cladding glass consisting essentially by weight of:

| | Percent |
|---|---|
| $SiO_2$ | 64–65 |
| $Al_2O_3$ | 8–9 |
| $B_2O_3$ | 11–12 |
| $Na_2O$ | 13–15 |
| $Li_2O$ | 2–3 |

* * * * *